United States Patent
Prokes et al.

(10) Patent No.: US 12,511,726 B2
(45) Date of Patent: Dec. 30, 2025

(54) SYSTEM AND METHOD FOR COLORED ARTIFACT DETECTION

(71) Applicant: Shutterfly, LLC, San Jose, CA (US)

(72) Inventors: Matthew John Prokes, Cottage Grove, MN (US); Ganesh Tiwari, New Brighton, MN (US)

(73) Assignee: Shutterfly, LLC, San Jose, CA (US)

(*) Notice: Subject to any disclaimer, the term of this patent is extended or adjusted under 35 U.S.C. 154(b) by 279 days.

(21) Appl. No.: 18/344,619

(22) Filed: Jun. 29, 2023

(65) Prior Publication Data
US 2025/0005729 A1    Jan. 2, 2025

(51) Int. Cl.
| | | |
|---|---|---|
| *G06T 7/00* | (2017.01) | |
| *G06T 5/77* | (2024.01) | |
| *G06T 7/70* | (2017.01) | |
| *G06T 7/90* | (2017.01) | |
| *G06F 3/04845* | (2022.01) | |

(52) U.S. Cl.
CPC ............ *G06T 7/0002* (2013.01); *G06T 5/77* (2024.01); *G06T 7/70* (2017.01); *G06T 7/90* (2017.01); *G06F 3/04845* (2013.01); *G06T 2200/24* (2013.01); *G06T 2207/10024* (2013.01); *G06T 2207/20092* (2013.01); *G06T 2207/30168* (2013.01)

(58) Field of Classification Search
CPC .......... G06T 7/0002; G06T 7/70; G06T 7/90; G06T 5/77; G06T 2200/24; G06T 2207/10024; G06T 2207/20092; G06T 2207/30168; G06T 2207/30196; G06F 3/04845
See application file for complete search history.

(56) References Cited

U.S. PATENT DOCUMENTS 6,912,313 B2    6/2005  Li
8,319,797 B2    11/2012 Swanson et al.
(Continued)

FOREIGN PATENT DOCUMENTS

JP    2011041094 A    2/2011

OTHER PUBLICATIONS

Naftali Harris; https://www.naftaliharris.com/blog/visualizing-dbscan-clustering; Visualizing DBSCAN Clustering; Jan. 24, 2015; 3 pages.
(Continued)

*Primary Examiner* — Sean T Motsinger
(74) *Attorney, Agent, or Firm* — Merchant & Gould P.C.

(57) ABSTRACT

Methods and systems for detecting colored artifacts on an image of subject are disclosed. An image may be received, wherein the image has undergone background replacement processing. The image may include colored artifacts as a result of errors in background replacement processing. A density of colored artifacts on the image may be determined, and in response to a determination that the image has a density of colored artifacts that exceeds a predetermined threshold, the image may be displayed on a user interface. The user interface may include a selectable element that, in response to being selected, causes the colored artifacts to be highlighted on the image displayed on the user interface. Colored artifacts on the image may then be corrected to improve the image quality before the image is sent to a customer as a final image product.

20 Claims, 8 Drawing Sheets

(56) References Cited

U.S. PATENT DOCUMENTS

| | | |
|---|---|---|
| 8,730,341 B2 | 5/2014 | Nashizawa |
| 8,861,867 B2 | 10/2014 | Bvn |
| 8,878,958 B2 | 11/2014 | Ichiyama et al. |
| 9,838,661 B2 | 12/2017 | Benson |
| 10,474,006 B2 | 11/2019 | Ariav et al. |
| 10,997,690 B2 | 5/2021 | Schwartz et al. |
| 2003/0012435 A1 | 1/2003 | Forde |
| 2013/0004446 A1 | 1/2013 | Bui et al. |
| 2013/0024324 A1 | 1/2013 | Davis, Jr. |
| 2014/0085509 A1* | 3/2014 | Ichikawa ............... H04N 1/41 348/231.99 |
| 2015/0277809 A1* | 10/2015 | Kim ...................... G06F 3/1204 358/1.15 |
| 2019/0154822 A1* | 5/2019 | Berlin ................ G01S 7/52041 |
| 2021/0319781 A1* | 10/2021 | Gullo ................... G06F 40/166 |
| 2022/0005190 A1* | 1/2022 | N G ...................... G06T 7/0012 |
| 2022/0375426 A1 | 11/2022 | Nam et al. |
| 2022/0377259 A1* | 11/2022 | Li ....................... G11B 27/036 |
| 2023/0352147 A1* | 11/2023 | Abdolell ................ G16H 40/20 |
| 2025/0005729 A1* | 1/2025 | Prokes .................. G06T 7/0002 |
| 2025/0173207 A1* | 5/2025 | Nannapaneni ...... G06F 11/0766 |

OTHER PUBLICATIONS

The Apache Software Foundation; https://commons.apache.org/proper/commons-math/userguide/ml.html; 16 Machine Learning; Dec. 22, 2022; 4 pages.

The Apache Software Foundation; https://commons.apache.org/proper/commons-math/javadocs/api-3.6.1/org/apache/commons/math3/ml/clustering/DBSCANClusterer.html; Class DBSCANClusterer<T extends Clusterable>; copyright 2003-2016; accessed on Jun. 29, 2023; 3 pages.

36PIX Inc.; Smart technology to create perfect images; copyright 2023; accessed on Jun. 29, 2023; 20 pages.

REMOVEBG; www.remove.bg; Remove Image Background; accessed on Jun. 29, 2023; 12 pages.

* cited by examiner

SYSTEM AND METHOD FOR COLORED ARTIFACT DETECTION

BACKGROUND

During a photography session, such as school photography session, a photograph of a subject is taken. During image processing of the photograph, the background of the photograph may be replaced to change the color or scene in the background behind the subject. When performing background replacement processing, a clean background replacement is not always identified, which can lead to unwanted colored artifacts in the final photo or image product sent to a customer. Quality control is important for photography retailers to ensure that the photographs and images sent to customers meet an acceptable quality. Thus, different techniques for processing images and photographs after they undergo background replacement processing are required to detect colored artifacts before the photographs are sent to customers as a final image product. It is with respect to these and other general considerations that embodiments have been described.

SUMMARY

In general, the present disclosure relates to methods and systems for detecting colored artifacts on an image of a subject after the image has undergone background replacement processing. In a first aspect, example methods for detecting colored artifacts on an image of a subject may include receiving an image, wherein the image has undergone background replacement processing; determining a density of colored artifacts on the image; in response to a determination that the image has a density of colored artifacts that exceeds a predetermined threshold, displaying the image on a user interface, wherein the user interface includes a selectable element that, in response to being selected, causes the colored artifacts to be highlighted on the image displayed on the user interface; receiving a selection through the user interface of the selectable element; and in response to receiving the selection of the selectable element, highlighting the colored artifacts on the image displayed on the user interface.

In a second aspect, an example system for detecting colored artifacts on an image of a subject may include a user interface; and a computing system including a processor, and a memory communicatively coupled to the processor, the memory storing instructions executable by the processor to: receive an image, wherein the image has undergone background replacement processing; determine a density of colored artifacts on the image; in response to a determination that the image has a density of colored artifacts that exceeds a predetermined threshold, display the image on a user interface, wherein the user interface includes a selectable element that, in response to being selected, causes the colored artifacts to be highlighted on the image displayed on the user interface; receive a selection through the user interface of the selectable element; and in response to receiving the selection of the selectable element, highlight the colored artifacts on the image displayed on the user interface.

In a third aspect, an example computer-readable storage device storing data instructions that, when executed by a processing device of a computing device, cause the computing device to generate a user interface comprising: an image of a subject, wherein the image has undergone background replacement processing and includes a density of colored artifacts that exceeds a predetermined threshold; an indicator reflecting a level of colored artifacts detected on the image; a first selectable element that, in response to being selected, causes the colored artifacts on the image to be highlighted, wherein the highlighting of the colored artifacts is presented in a color different from the colored artifacts; and a second selectable element that, in response to being selected, causes a notification to be sent to a photography retailer computing device indicating that a quality of the image is acceptable to send the image to a customer computing device based on a manual inspection for colored artifacts on the image.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
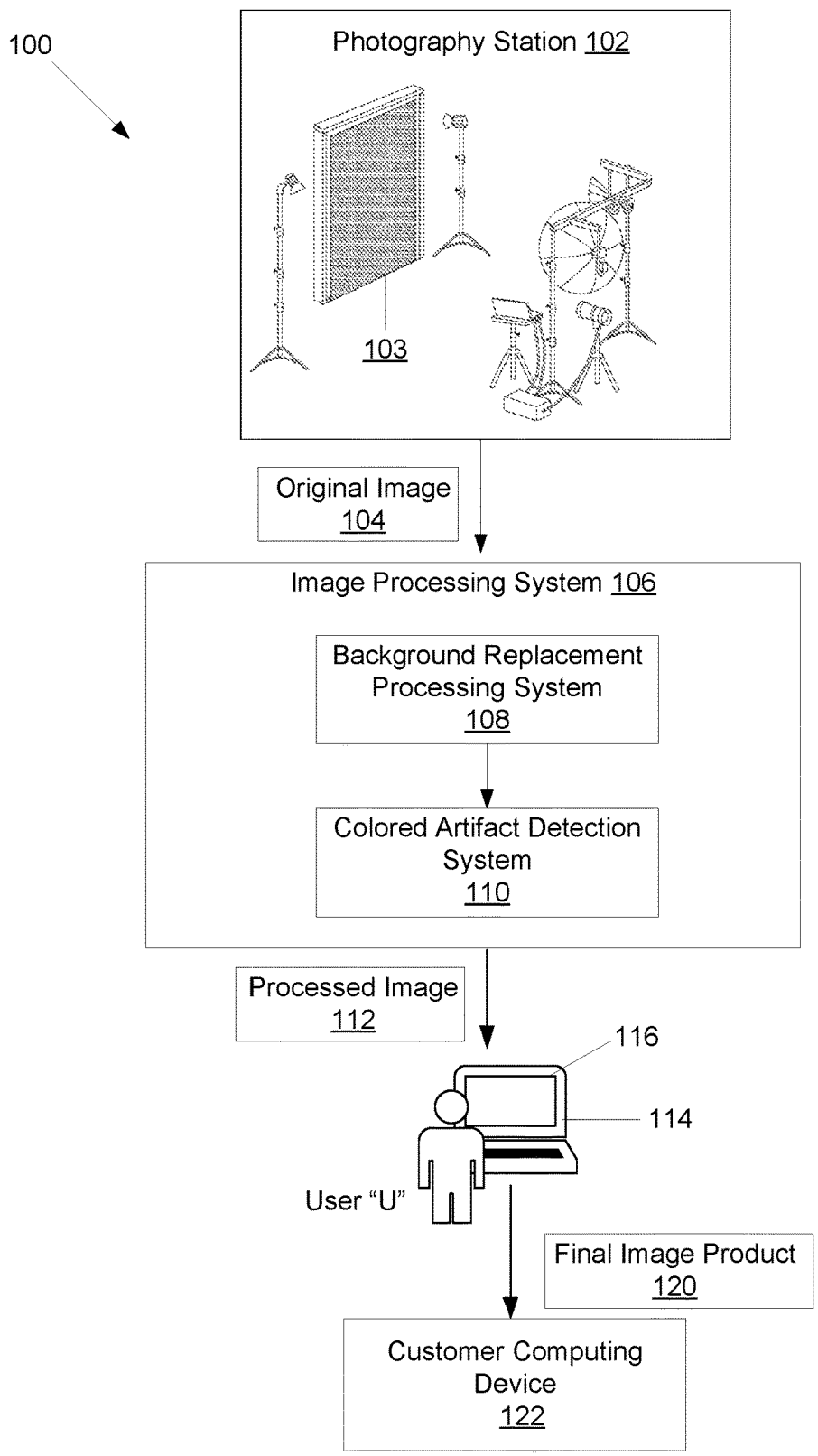
FIG. 1 illustrates an example environment where a system for detecting colored artifacts on an image may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, some embodiments of the present disclosure are directed to detecting colored artifacts on an image of a subject. The image may be a photograph of a subject captured by a photographer using a photography station. For example, a photography station may be set up at a location, such as a school, to capture photographs of subjects. The photography station may include a backdrop, such as a blue or gray backdrop. After a photograph is taken of a subject, the image may undergo background replacement processing to replace the background. For example, if the photograph was taken with a blue background behind the subject, the image may undergo background replacement processing to replace the blue background with a nature scene background or an American flag background. During background replacement processing, image masking is used to replace the background photographed behind the subject with a different background in the final image product. An image mask allows a certain portion of an image (e.g., the background) to be adjusted while leaving the rest of the image completely untouched. However, when performing background replacement processing, a clean background replacement is not always identified, which can lead to unwanted colored artifacts in the final image product. For example, residual colors from the original background may spill or bleed onto the subject, particularly along the edges where the subject area meets the background area. Therefore, a final image product may include colored artifacts in a subject's hair, or the original background color or pattern may bleed into the subject's clothing. In examples, colored artifacts can be difficult for a user to easily see when viewing an image, so the colored artifacts may not be detected during a manual review of the image and removed before a final image product is sent to a customer. If a final image product having colored artifacts is sent to a customer, the customer may be unhappy with the quality of the image.

A colored artifact detection system and user interface as described herein detects and displays colored artifacts on images that have undergone background replacement, thereby improving the quality of final image products by minimizing the number of final products containing colored artifacts sent to customers. Following background replacement processing of an image, the starting or original image taken using a photography station may be compared to the background replaced image to generate an image mask. The image mask may be used to identify whether any pixel change has occurred. Subsequently, if any pixel change has occurred, the colored artifact detection system may determine whether the changed pixel is in a predetermined color range. In examples, if the original photograph was taken in front of a blue backdrop, the predetermined color range may be blue. Any changed pixels in the blue color range may then be identified and the location of blue pixels may be recorded. Density-based clustering may then be used to identify distinctive groups or clusters of blue pixels. The blue pixel clusters may be representative of noticeable blue artifacts on the image. If the density of blue pixel clusters exceeds a predetermined threshold, the colored artifact detection system may determine that the image requires manual review and evaluation for colored artifacts before the image can be sent to a customer.

Having determined that an image requires manual review, the image may be displayed on a device having a screen that presents a user interface. The user interface may display the image and include a plurality of selectable elements. A user, such as an employee of a photography company or retailer, may view the image and select an element on the user interface that causes the colored artifacts (e.g., blue artifacts) on the image to be highlighted. As a result, colored artifacts that may otherwise be difficult for a user to see may be highlighted in such a way that the colored artifacts stand out and are easily seen. For example, blue artifacts may be difficult to see against a blue or gray background, but if they are highlighted in yellow, they may become more obvious and easier for a user to see. The user may then determine whether the image requires further processing to correct or remove the colored artifacts from the image. In examples, the colored artifacts on the image may be removed, at which point the image may be of an acceptable quality to be sent to a customer. The process of detecting colored artifacts on an image, presenting the image on a user interface for manual review by a user, and removal of detected colored artifacts may occur iteratively until the image quality is acceptable (e.g., no or low level of colored artifacts detected) to send to a customer.

FIG. 1 illustrates an example environment 100 where a system for detecting colored artifacts may be implemented. The system may be a colored artifact detection system 110, which may be associated with a photography company or retailer that captures and processes photographs and images. The system 100 may include a photography station 102. The photography station 102 may include components for capturing photographs in a particular manner to ensure the photographs are suitable for background replacement processing. In examples, the photography station 102 may include an image capture system that includes a camera, a controller, and a computing device. The camera may be a digital camera that operates to capture digital images of one or more subjects. The photography station 102 may further include a plurality of lights. For example, the photography station 102 may include a main light, a fill light, a background light device, a hair light device, and a floor light. The controller may be electrically connected or wirelessly connected to the camera, the computing device, and the lights. A backdrop or photographic scene 103 may also be included within the photography station 102. The backdrop 103 is an area or scenery that appears behind the one or more subjects from the perspective of the image capture system, so that the backdrop 103 appears in the background of the image captured by the image capture system.

The photography station 102 may capture a photograph of a subject in front of the backdrop 103 and send the original image 104 to an image processing system 106. One or more servers or processors may be operable to execute the components of the image processing system 106, including a background replacement processing system 108 and the colored artifact detection system 110. The background replacement processing system 108 operates to replace the background captured in the original image (e.g., the backdrop) with a different background. In examples, a customer may place an order for an image having a selected background, so an original image may undergo background replacement processing to generate a final image product having the selected background.

As described in greater detail below, the colored artifact detection system 110 may detect colored artifacts on an image after background replacement processing. Thus, the background replacement processing system 108, after replacing the background in the original image 104, may send an image file including the original image 104 and the background replaced image to the colored artifact detection system 110 for further processing. The colored artifact detection system 110 may then determine whether there are colored artifacts on the image as a result of the background replacement processing. The colored artifact detection system 110 may further determine an amount or density of colored artifacts on the image, and the precise location of colored artifacts on the image. The method and process for detecting colored artifacts on an image is described in greater detail below with reference to FIGS. 2-4.

The colored artifact detection system 110 may send the image 112 after processing to a computing device 114 associated with a photography company or retailer. The computing device 114 may have a screen 116 configured to display a user interface. The image 112 may be displayed on the user interface and viewed by a user U associated with the photography company or retailer. The user U may view the image 112 and select a selectable element on the user interface to highlight the colored artifacts detected on the image by the colored artifact detection system 110. The highlighting may cause the user U to easily see the colored artifacts detected on the image. The user U may then manually review the image and determine if the image requires further processing to fix or remove colored artifacts. When the image is of an acceptable quality, for example, after colored artifacts are removed from the image, a final image product 120 may be sent to a customer computing device 112. The customer computing device 112 may be associated with a customer that placed an order for a final image product.

Figure 2:
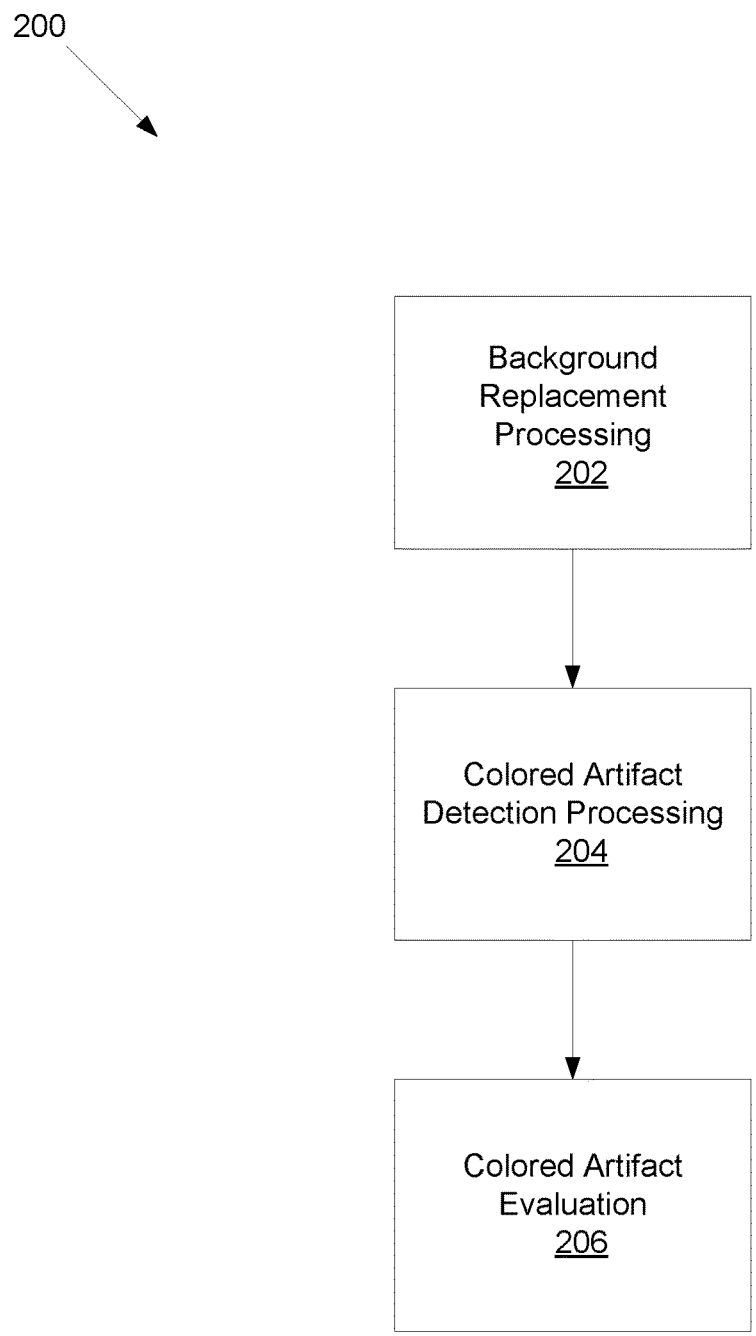
FIG. 2 is a flowchart illustrating example phases of image processing for detecting and evaluating colored artifacts on an image.

FIG. 2 is a flowchart illustrating example phases 200 of image processing for detecting and evaluating colored artifacts on an image. Following a photography session using a photography station 102 as described with reference to FIG. 1, a photograph or image may undergo a series of phases of image processing before a final image product is sent out to a customer. As described above, the image may first undergo background replacement processing 202. The background replacement processing may be performed by the background replacement processing system 108 as described with reference to FIG. 1. After the background is replaced during background replacement processing 202, the image may then undergo colored artifact detection processing 204. The colored artifact detection processing 204 may be performed by the colored artifact detection system 110 as described with reference to FIG. 1. The colored artifact detection processing phase 204 is described in greater detail below with reference to FIGS. 3 and 4. If the colored artifact detection processing phase 204 detects colored artifacts on the image, the image may be evaluated for the presence of colored artifacts during phase 206. In examples, the image may be evaluated for colored artifacts at phase 206 if the amount or density of colored artifacts on the image exceeds a predetermined threshold. The colored artifact evaluation 206 may include displaying the image on a user interface for manual review of the image. In examples, the colored artifact evaluation 206 may include highlighting the colored artifacts on the image displayed on a user interface. By displaying and highlighting the colored artifacts on the image on a user interface, a user can manually review the image to determine if the image requires further processing to remove colored artifacts from the image before a final image product is sent to a customer.

Figure 3:
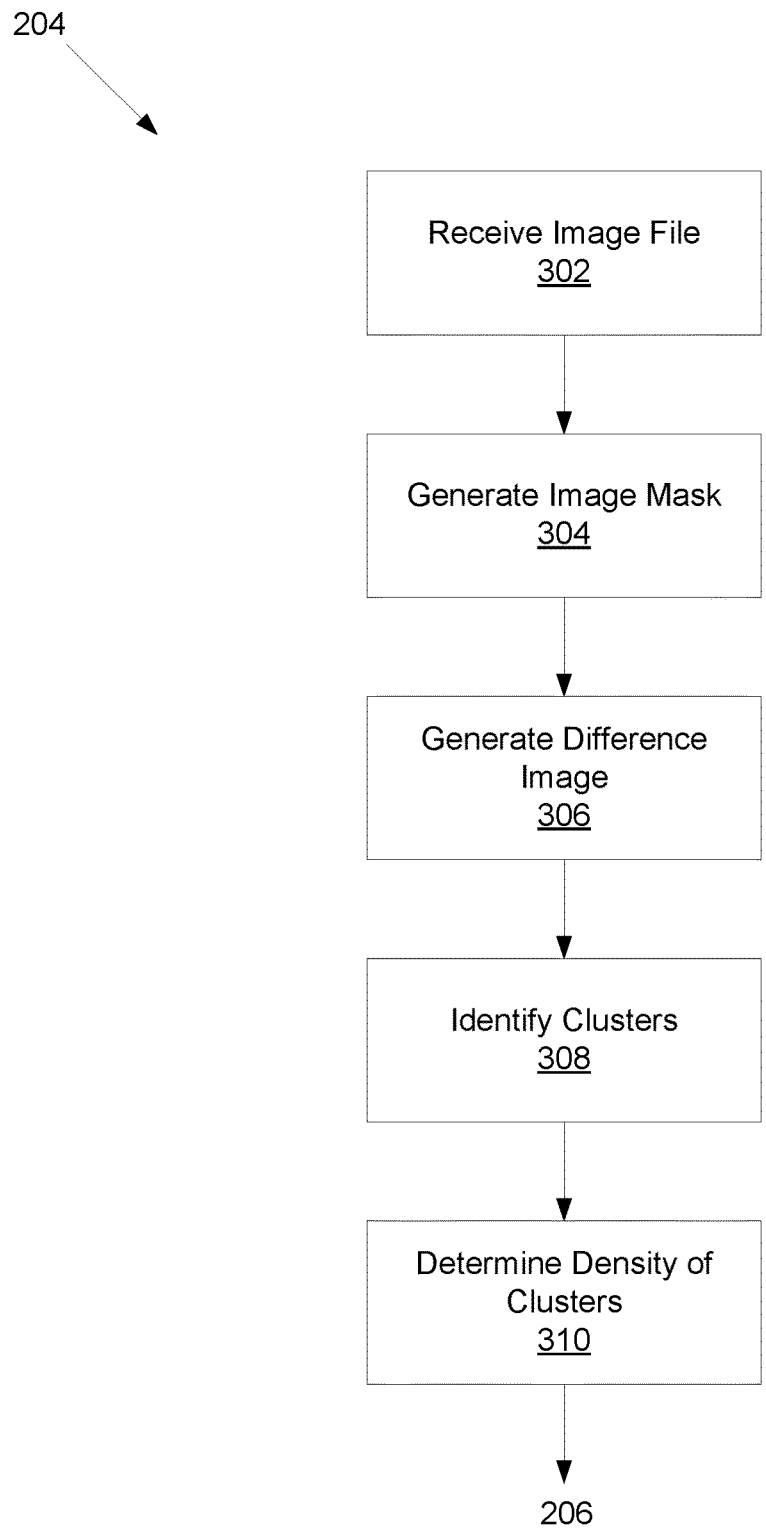
FIG. 3 is a flowchart illustrating example colored artifact detection processing performed at the colored artifact detection system.

FIG. 3 is a flowchart illustrating the colored artifact detection processing phase 204 of FIG. 2 performed by the colored artifact detection system. The colored artifact detection processing or method 204 performs the operations 302, 304, 306, 308, and 310. The colored artifact detection processing 204 may be performed to determine a density of colored artifacts on an image and determine whether an image has a density of colored artifacts that requires further processing to remove colored artifacts from the image before the image is sent out as a final image product to a customer.

The operation 302 receives an image file. The image file may be an output from the background replacement processing system after background replacement processing is completed. The image file may include the starting or original image before background replacement processing, and the image after undergoing background replacement processing. The image file may further include original image data and processed image data.

The operation 304 generates an image mask. An image mask may be generated at operation 304 to determine whether any pixel change has occurred as a result of the background replacement processing. To generate an image mask, the colored artifact detection system compares the original image with the processed image after background replacement to determine, on a pixel by pixel basis, whether any pixel change has occurred as a result of the background replacement processing. The image mask generated in operation 304 may be a binary image with black and white pixels, wherein a white pixel area represents pixels that have changed and a black pixel area represents pixels that have not changed after background replacement processing. In examples, the area of the image containing the subject may be expected to be a black pixel area since pixels on the subject area are typically not intended to be changed during background replacement processing. Similarly, in examples, the background area of the image may be expected to be a white pixel area, since pixels in the background are typically expected to change during background replacement processing. The white pixel area, as the area representing changed pixels, may then require further evaluation to detect colored artifacts. The black pixel area, as the area where no pixel change occurred, does not require evaluation to detect colored artifacts.

The operation 306 generates a difference image. To generate a difference image, the colored artifact detection system performs further evaluation on each pixel in the white pixel area on the image mask to determine if the changed pixel being evaluated is in a predetermined color range. For example, if the original image includes a blue background, the predetermined color range may be blue. In examples, the evaluation may only detect changed pixels in a certain threshold of the predetermined color range. For example, if the predetermined color range is blue, extremely light or extremely dark blues may not be detected or may be detected and ignored. The predetermined color range may be input received by the colored artifact detection system from a computing device associated with a photography company or retailer. In some examples, the colored artifact detection system may automatically detect a predetermined color range based on an evaluation of the background area in the original image. If changed pixels being evaluated by the colored artifact detection system are in the predetermined color range, the location of such changed pixels may be recorded. The location of the changed pixels may be recorded by recording the (X, Y) coordinates of the changed pixels. The changed pixels may represent colored artifacts that may appear on the image as a result of errors or mistakes made during background replacement processing.

The operation 308 identifies clusters of changed pixels on the image. In examples, clusters of changed pixels, which may represent areas of noticeable colored artifacts on an image, may be identified because the presence of a low amount or density of colored artifacts on an image may not cause a quality control problem with a final image product. For example, if only a single pixel or a small number of pixels grouped together are identified as changed pixels in the predetermined color range, this low level or amount of colored artifacts may not be visible on a final image product, so manual review of the image for colored artifacts may not be necessary. Similarly, if the density of changed pixels in the predetermined color range grouped together is low and does not exceed a predetermined density, manual review of the image for colored artifacts may not be necessary.

Once the locations of changed pixels in the predetermined color range are identified and recorded, the density of changed pixels may be determined. In examples, a DBSCANClusterer unsupervised algorithm, available through Apache Commons Math 3.6 API, available at commons.apache.org/proper/commons-math/javadocs/api-3.6.1/index.html and commons.apache.org/proper/commons-math/javadocs/api-3.6.1/org/apache/commons/math3/ml/clustering/DBSCANClusterer.html, may be used to identify clusters of changed pixels on the image. The (X, Y) coordinate location of the changed pixels determined from the difference image generated in operation 306 may be input into the DBSCAN algorithm. The spatial analysis performed using DBSCAN may have a static or user configurable density supplied to the algorithm indicating the proximity between pixels that is required for pixels to be identified as a part of a cluster. The size or density of the identified clusters of changed pixels may determine whether the changed pixels may be visually noticeable as colored artifacts on the image when a final image product is generated and therefore whether further evaluation of the image may be required to assess the presence of colored artifacts. While the DBSCANClusterer algorithm may be utilized to identify clusters of changed pixels, other processes and techniques for identifying clusters of changed pixels and assessing the density of clusters may be used in operation 308.

The operation 310 determines a density of clusters of colored artifacts identified in operation 308. In examples, after all clusters of changed pixels have been identified in operation 308, the DBSCAN algorithm evaluates the size and number of pixels within each cluster to determine a density. In examples the density may be a ratio of changed pixels relative to the surface area of the image or the cropped portion of the image being evaluated. Once a density is determined in operation 310, the image may be categorized based on the dentistry of colored artifacts. In examples, the categories may be very high, high, medium, and low. Images having a very high density of colored artifacts may be categorized as very high, and images having a low density of colored artifacts may be categorized as very low. The thresholds for the different categories may be predetermined and received as input from a user through a computing device associated with a photography company or retailer. Moreover, a predetermined density threshold may be identified, wherein images having a density of colored artifacts that exceed the predetermined threshold will be sent for further evaluation at operation 206 to determine if the image requires further processing to remove colored artifacts. Images having a density of colored artifacts that does not exceed the predetermined threshold will not be sent for further evaluating prior to generating a final image product. For example, if the density of colored artifacts on the image is above a predetermined density threshold, the colored artifact detection system may send the image to a computing device to be displayed on a user interface for further evaluation of the colored artifacts during phase 206, as described with reference to FIG. 2. In examples, the density may exceed the predetermined threshold if the density of colored artifacts is categorized as either very high or high. Example user interfaces displaying the image for further evaluation are described in more detail with reference to FIGS. 6 and 7.

Figure 4:
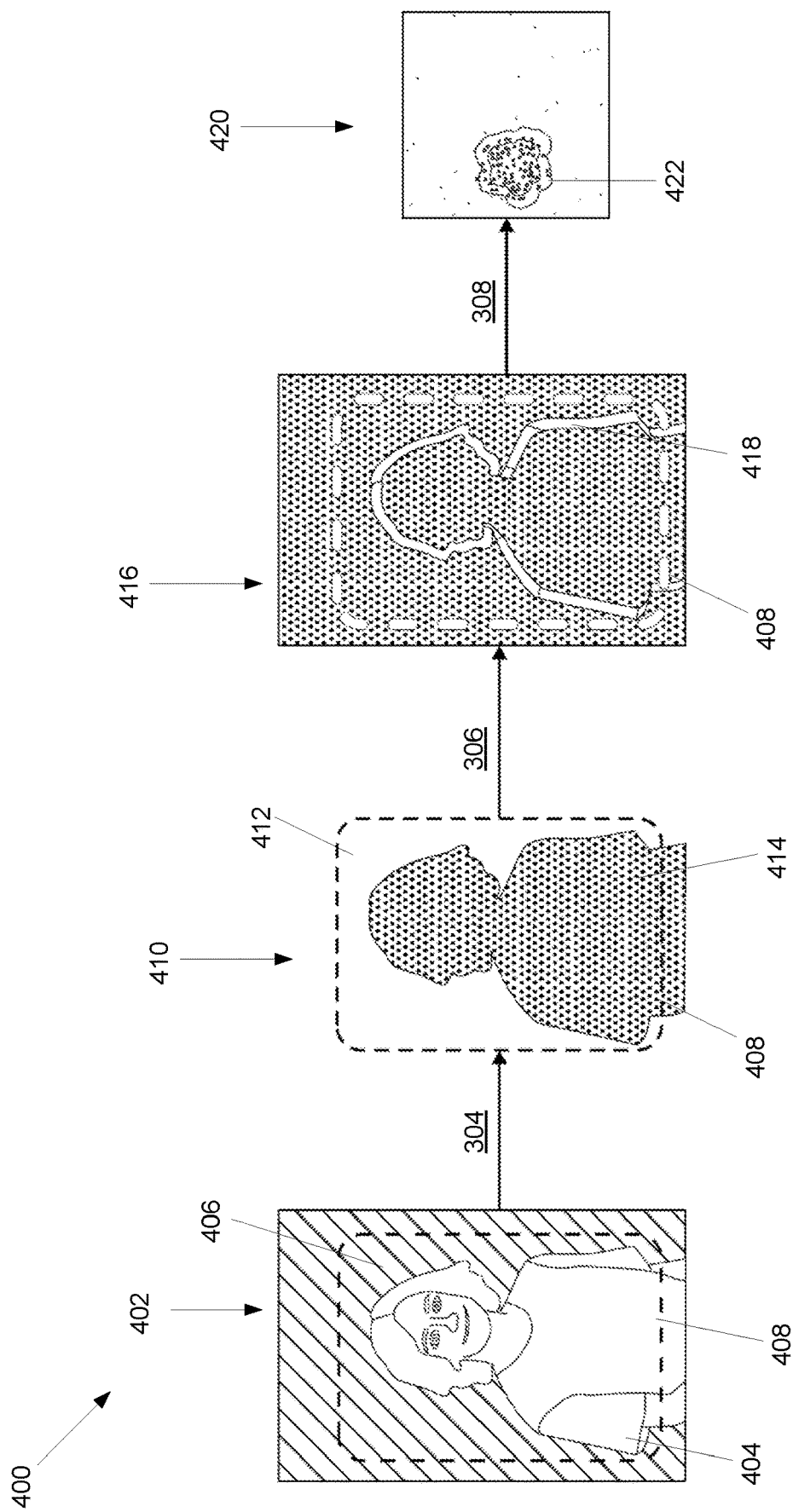
FIG. 4 illustrates an example execution of aspects of image processing by a colored artifact detection system.

FIG. 4 illustrates an example execution 400 of aspects of image processing by the colored artifact detection system. An original or starting image 402 of a subject 404 may be received by the colored artifact detection system. The original image 402 may have a background 406. The background 406 may be the backdrop 103 in the photography station 102 used to capture the image as described with reference to FIG. 1. In examples, a portion or cropped area 408 of the original image 402 may be defined, the defined portion 408 being less than the entire original image 402. In these examples, only the defined portion 408 may be analyzed or evaluated by the colored artifact detection system for colored artifacts on the image 402. By evaluating a defined portion 408 less than the entire original image 402, a specific portion of the original image 402 most likely to have colored artifacts (e.g., the area around the edge of a subject) may be focused on, which may increase the accuracy of detecting colored artifacts by reducing the area to be evaluated. In some examples, image processing techniques for identifying the face area of a subject or the entire subject area may be used to determine the defined portion 408 of the image.

An image mask 410 may then be generated at operation 304, as discussed above with reference to FIG. 3. The image mask 410 may be generated for the defined portion 408 of the original image 402. In examples, the image mask 410 may be a binary image, wherein changed pixels are shown in white and pixels that did not change during background replacement processing are shown in black. Thus, the area with no pixel change 414 may be black, and the area with pixel change may be white 412. In examples, generally, the subject area of the image mask 410 may be black and the background area may be white, because generally the background area includes changed pixels after background replacement processing, whereas generally the subject area does not have changed pixels after background replacement processing.

A difference image 416 may then be generated at operation 306, as discussed above with reference to FIG. 3 The difference image 416 may only show the pixels that have been modified or changed during background replacement processing. The colored artifact detection system may then evaluate the changed pixels in the difference image 416 and identify any changed pixels in a predetermined color range. The difference image 416 may then show the changed pixels in the predetermined color range 418. In examples, the changed pixels in the predetermined color range 418 may appear around the edge of the subject area. In examples, the difference image 416 may display the defined portion 408 of the image as black pixel except for the changed pixels in the predetermined color range 418. Thus, the difference image 416 may identify and display the precise location of changed pixels in the predetermined color range 418. In some examples, once the changed pixels in the predetermined color range 418 have been identified, the location of each changed pixel in the predetermined color range may be recorded. The location of the changed pixels in the predetermined color range may be recorded using (X,Y) coordinates.

The density of colored artifacts may then be determined at operation 308, as discussed above with reference to FIG. 3. In examples, the location of the changed pixels in the predetermined color range may be provided as input into the DBSCAN algorithm as discussed with reference to FIG. 3. The DBSCANClusterer unsupervised algorithm may identify clusters of changed pixels on the image and determine a density of the identified clusters. The DBSCAN algorithm may generate an output 420 displaying the clusters 422 of colored artifacts identified on the image. In examples, the display of the clusters 422 may be colored such that higher density clusters or portions of clusters appear in a different colors or shades of a color than lower density clusters or portions of the clusters. Based on the output from the DBSCAN algorithm, the colored artifact detection system may determine whether the density of colored artifacts on the exceeds a predetermined threshold. In examples, if the density of colored artifacts does exceed the predetermined threshold, the output from the DBSCAN algorithm, including the location and density of clusters of colored artifacts on the image may be saved and sent, along with the image, to a computing device associated with a photography company or retailer so the image can be displayed on a user interface and the colored artifacts on the image can be further evaluated during a manual review.

Figure 5:
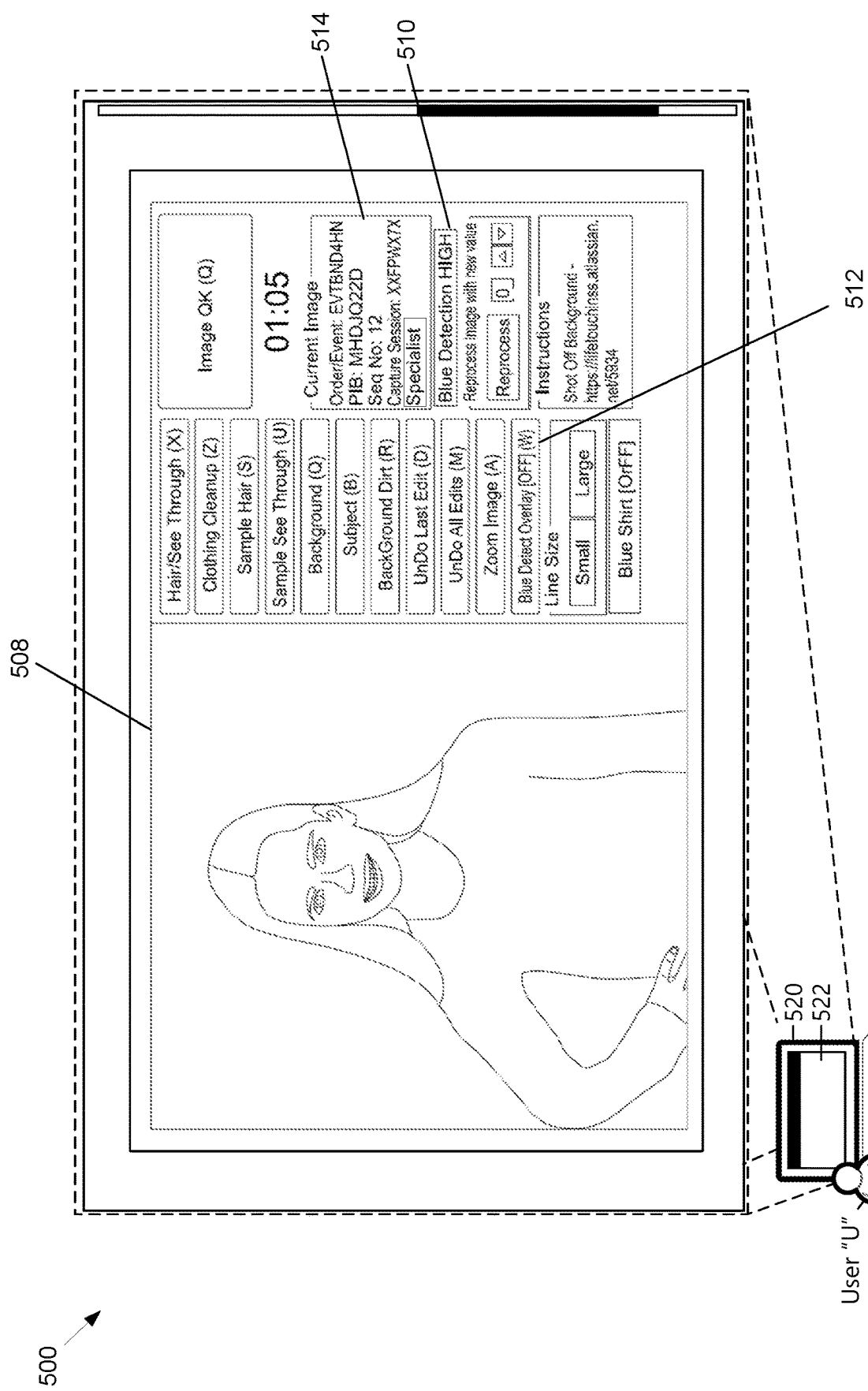
FIG. 5 illustrates an example user interface displaying output from a colored artifact detection system.

FIG. 5 illustrates an example user interface 500 displaying output from the colored artifact detection system. Generating a user interface can include displaying it on a display device, or can include generating (such as by a server) data that is sent to another computing device to be displayed on that computing device. The user interface 500 may be presented on a screen 522 of a computing device 520 associated with a user U. The user U may be an individual associated with a photography company or retailer tasked with manually reviewing or evaluating an image captured by a photography station before the image is sent as a final photo product to a customer. The user interface 500 may include the image 508 received by the colored artifact detection system. The user interface 500 may further include information and details associated with the image 514, such as, for example, image identification information.

The user interface 500 may include an indicator 510 of a level of colored artifacts detected on the image by the colored artifact detection system. The level of colored artifacts detected on the image may be based on a density of colored artifact pixels on the image, wherein the amount of colored artifacts may be categorized as very high, high, medium, or low. The category of colored artifacts (e.g., very high, high, medium, low) may be based on predefined amounts, densities, or ratios of colored artifact pixels on the image.

In examples, the categories of colored artifacts may be defined based on a number of colored artifact pixels detected on an image. For example, a predetermined threshold may be established such that an image with greater than 12,000 colored artifact pixels is categorized as very high. Thus, an image with 50,000 colored artifact pixels detected on a defined portion of the image may be categorized as very high, and an image with 11,000 colored artifact pixels detected on a defined portion of the image may be categorized as high.

The density of colored artifacts may be a ratio. In examples, the ratio may be the number of colored artifact pixels relative to a surface area of the image or the total number of pixels in a defined portion of the image. In examples, the ratio may be a measure of the number of colored artifact pixels part of colored artifact clusters that are larger than a predetermined minimum cluster size by a factor of N, relative to the total number of changed pixels in the predetermined color range (e.g., possible colored artifacts) provided as input into the DBSCAN algorithm. For example, 50 clusters of colored artifacts may be identified in an image, but 20 of the clusters may have a density lower than a predetermined threshold or minimum cluster size, so only 30 clusters have a density larger than the predetermined minimum cluster size. Of the 30 clusters, the clusters that are larger than N times the predetermined minimum cluster size are identified, and the total number of pixels within those identified clusters is determined. The total number of pixels from the identified clusters may then be divided by the total number of changed pixels in the predetermined color range provided as input into the DBSCAN algorithm to calculate a ratio. In some examples the value of N may be a whole number (e.g., 1, 2, 3, 4) or a decimal number (e.g., 2.5, 3.1). The calculated ratio may be mapped to a scale between 0 and 10, 10 being a very high ratio of colored artifacts on the image and 0 being a very low ratio of colored artifacts. In some examples, on the scale of 0 to 10, an image with a ratio that maps to 5-10 on the scale may be categorized as very high or high, an image with a ratio that maps to 3-4 on the scale may be categorized as medium, and an image with a ratio that maps to 0-2 on the scale may be categorized as low.

The image may only be sent by the colored artifact detection system to be displayed on the user interface 500 if the density of colored artifacts is above a predetermined density threshold. In examples, the image may only be sent by the colored artifact detection system to be displayed on the user interface 500 if the density of colored artifacts is categorized as very high or high.

The user interface 500 may include a plurality of selectable elements. The user interface 500 may include a selectable element 512 that, in response to being selected, causes colored artifacts to be highlighted on the image 508 displayed on the user interface 500. In examples, the user interface 500 may default to displaying the image 508 without the colored artifacts highlighted (e.g., "Blue Detect Overlay [Off]"). In response to receiving a selection by the user U of the selectable element 512, the colored artifacts on the image may be highlighted, as described with reference to FIG. 6.

Figure 6:
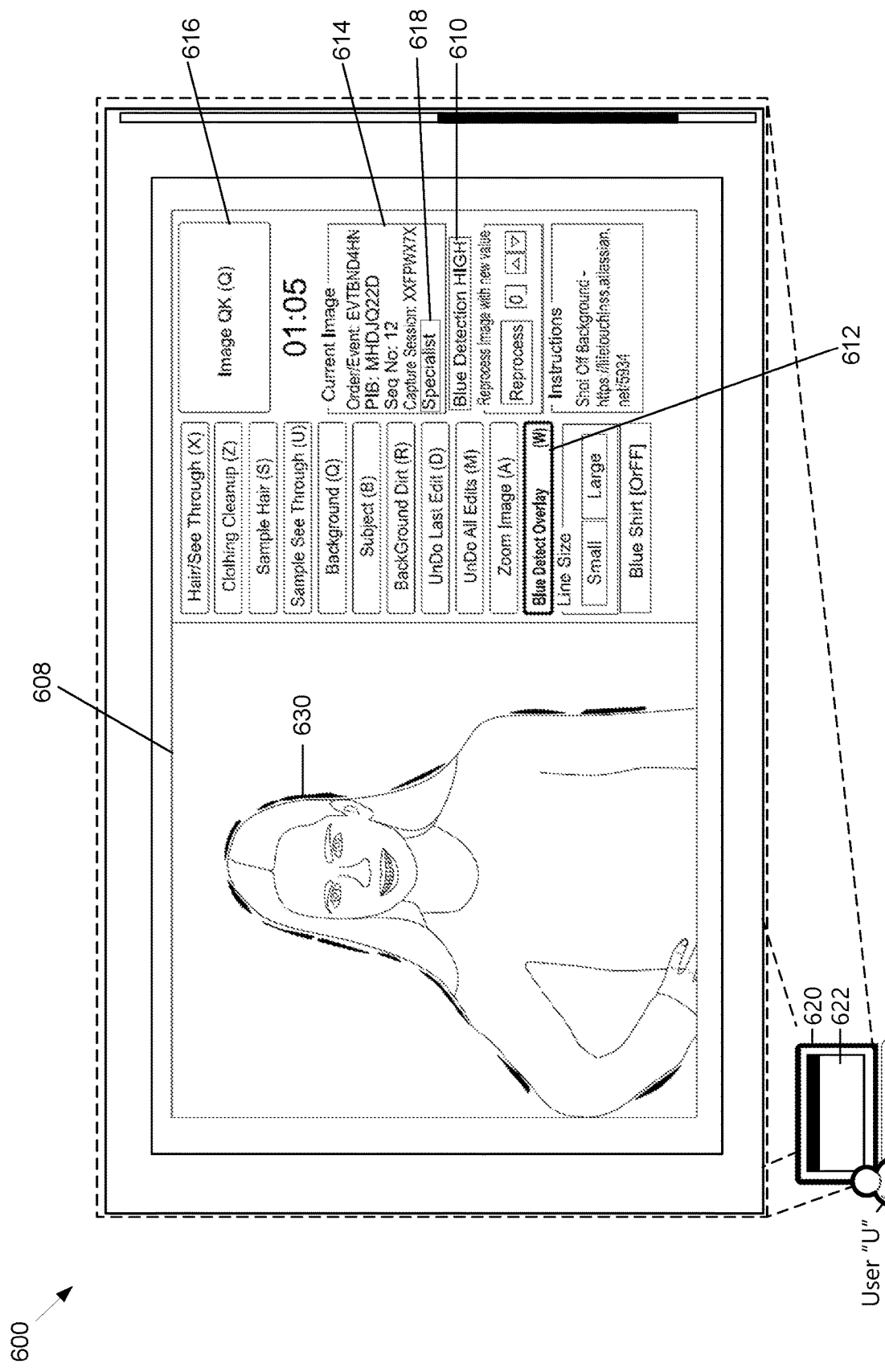
FIG. 6 illustrates an example user interface displaying output from a colored artifact detection system.

FIG. 6 illustrates an example user interface 600 displaying output from the colored artifact detection system. The user interface 600 illustrates the user interface 500 as described with reference to FIG. 5 after the selectable element 512, 612 has been selected by the user U. In response to receiving a selection of the selectable element 612, the colored artifacts on the image 608 may be highlighted 630. In examples, the highlighting 630 of the colored artifacts may be displayed on the user interface 600 in a color different from the colored artifacts. For example, if the colored artifacts on the image 6808 are blue, the highlighting 630 of the colored artifacts may appear in yellow.

The user U may manually review the image 608 with the colored artifacts highlighted to make a determination as to whether the image 608 requires further image processing to remove the colored artifacts before a final image product is sent to a customer. In examples, the user U may perform any necessary image processing to remove the colored artifacts from the image 608. In other examples, the user U may determine that a specialist is necessary to remove the colored artifacts on the image 608. A specialist may be necessary to remove the colored artifacts on the image, for example, if the amount of colored artifacts is particularly high or if the location of the colored artifacts is particularly complex (e.g., on sheer clothing worn by a subject in the image). The user interface 600 may include a selectable element 618 that, when selected, causes the image to be sent to a specialist with instructions for additional image processing to remove the colored artifacts from the image 608.

The user interface 600 may further include a selectable element 616 that, when selected, indicates that a quality of the image is acceptable to send to a customer based on a manual inspection for colored artifacts on the image. In examples, the user U may manually review the colored artifacts detected on the image, perform additional image processing to remove the colored artifacts from the image 608, manually review the image again, and determine that the quality of the image is acceptable to send to a customer. In response to a determination that the quality of the image is acceptable to send to a customer, the user may select the selectable element 616. In some examples, after the user U performs additional image processing on the image to remove the colored artifacts, the image may be sent back through the colored artifact detection processing 204 as described with reference to FIGS. 2 and 3. If the colored artifacts have indeed been removed or reduced, when the image goes through colored artifact detection processing again, the density of colored artifacts on the image may be below the predetermined density threshold, and the image may be sent to a customer as a final image product without additional colored artifact evaluation and manual review for colored artifacts. In examples, the feedback loop of detecting colored artifacts and correcting detected colored artifacts may occur continuously until the density of colored artifacts is below the predetermined density threshold.

In examples, the user U may manually review the colored artifacts detected on the image and determine that the image does not require additional image processing to remove colored artifacts. In examples where the image does not require additional image processing to remove colored artifacts, the colored artifact detection system may have encountered an error or mistake when determining that the density of colored artifacts exceeded a predetermined threshold, resulting in a false positive. If the user U determines that the image quality is acceptable to send to a customer without additional image processing, the user U may select the selectable element 616.

Figure 7:
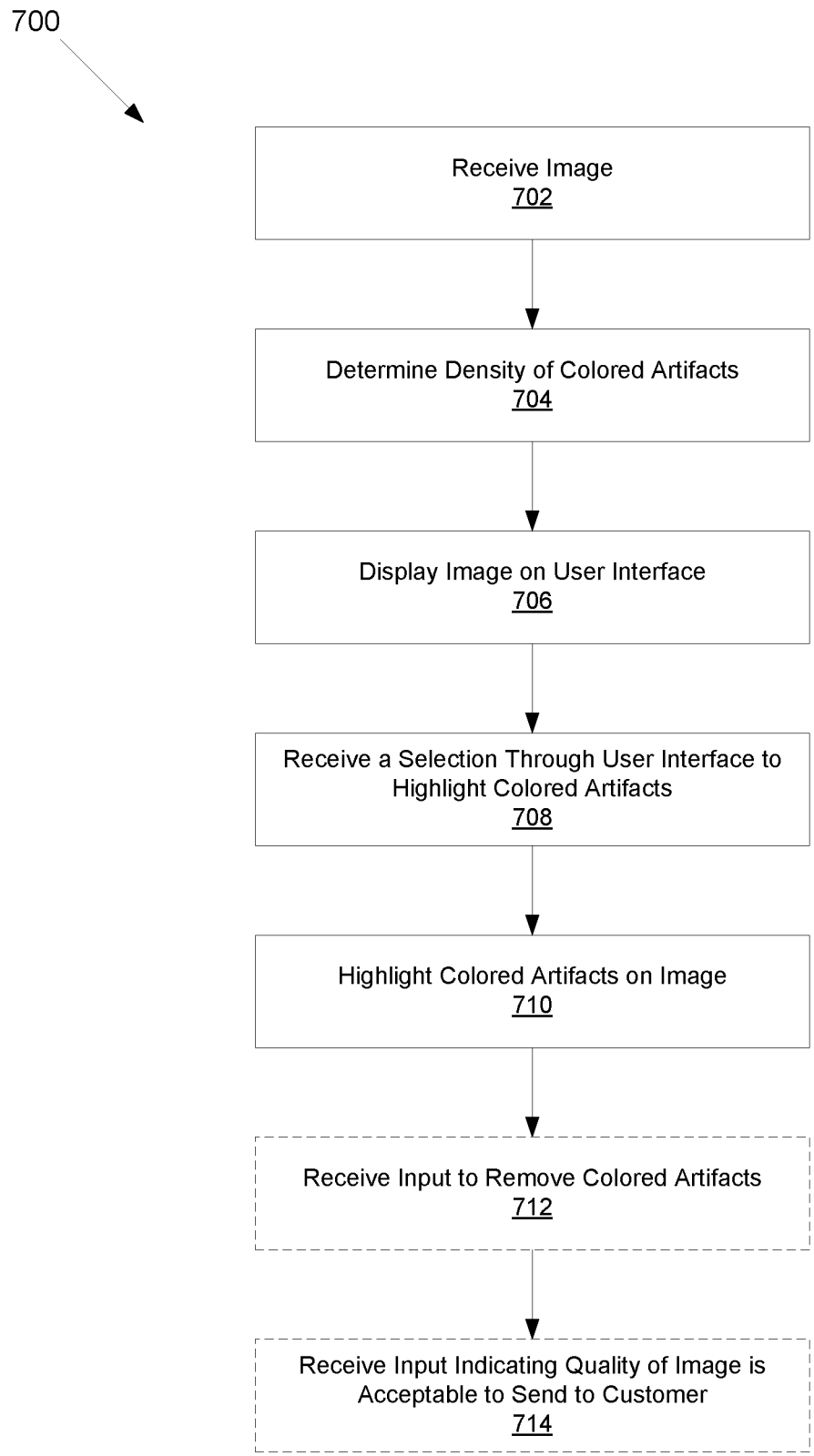
FIG. 7 illustrates an example method for detecting colored artifacts on an image.

FIG. 7 illustrates an example method 700 for detecting colored artifacts on an image. The method 700 may be performed at a server system, such as the colored artifact detection system 110 described with reference to FIG. 1. The server system may be controlled by a photography company or retailer.

The method 700 may begin at operation 702, where an image is received by the colored artifact detection system. The image received at operation 702 may have undergone background replacement processing to replace a background behind a subject. In examples, the image may be received as part of an image file, wherein the image file also includes the original image before the image underwent background replacement processing. The image file may further include original image data and processed image data. Once the image has been received by the colored artifact detection system, a density of colored artifacts on the image is determined at operation 704. The method of detecting colored artifacts and determining a density of colored artifacts on the image is described in greater detail above with reference to FIGS. 3 and 4. For example, a density of colored artifacts may be determined by generating an image mask by comparing the original image and the image after undergoing background replacement processing to identify pixels that changed during the background replacement processing, using the image mask to generate a difference image by identifying, within the identified changed pixels, pixels in a predetermined color range representative of colored artifacts on the image, identifying clusters of changed pixels on the difference image, and determining the density of colored artifacts within the clusters of changed pixels on the image.

Once a density of colored artifacts on the image is determined at operation 704, if the image has a density of colored artifacts that exceeds a predetermined threshold, the image may be presented and displayed on a user interface at operation 706. The user interface may be presented on a display screen of a device associated with a photography company or retailer. In examples, the image may be displayed on a user interface such as user interface 500 described with reference to FIG. 5. If the colored artifact detection system determines that the image does not have a density that exceeds the predetermined threshold, the image may be generated into a final image product and sent to a customer without any further evaluation of the image for colored artifacts.

At operation 708, the colored artifact detection system receives a selection through the user interface of a selectable element that when selected, highlights the detected colored artifacts. In examples, a user associated with a photography company or retailer may be performing a manual review of the image for blue artifacts and viewing the image on the user interface. The user may select a selectable element on the user interface that causes the colored artifacts on the image to be highlighted at operation 710. The selectable element may be selectable element 512, 612 as described with reference to FIGS. 5 and 6. When the colored artifacts on the image are highlighted, they may be easier for a user to see and evaluate. In examples, the colored artifacts on the image may be highlighted and the highlighted displayed on the user interface 600 as discussed with reference to FIG. 6. The colored artifacts on the image may be highlighted in a color different from the color of the detected colored artifacts. For example, if they colored artifacts are blue, they may be highlighted in yellow as presented and displayed on the user interface.

After the detected colored artifacts have been highlighted on the image displayed on the user interface, a user reviewing or evaluating the image may determine that the image requires further processing to remove the colored artifacts from the image before a final image product is sent to a customer. Thus, in examples, at operation 712, the colored artifact detection system may receive input through the user interface to remove the colored artifacts. In examples, the user may have the ability to remove the colored artifacts on the image using image processing techniques. In some examples, the user may send the image to a specialist with instructions to remove the colored artifacts on the image. A specialist may have more advanced skills and/or access to more advanced image processing techniques to remove the colored artifacts on the image. To send the image to a specialist, the user may select selectable element 618 as described with reference to FIG. 6.

At operation 714, the colored artifact detection system may receive input through the user interface indicating that the quality of the image is acceptable to send to a customer. In examples, the input received at operation 714 may be received through selectable element 616 as described with reference to FIG. 6. For example, a user may manually review the colored artifacts detected on the image, perform additional image processing to remove the colored artifacts from the image, manually review the image again, and determine that the quality of the image is acceptable to send to a customer. In some examples, the colored artifact detection system may identify false positives, wherein the colored artifact detection system mistakenly determined that the density of colored artifacts on the image exceeded a predetermined threshold. In these examples, a user may view the false positive image, determine that no further image processing is required to remove colored artifacts on the image, and select the selectable element on the user interface to indicate that the quality of the image is acceptable to send to a customer. A final image product may then be generated and sent to a customer computing device.

Figure 8:
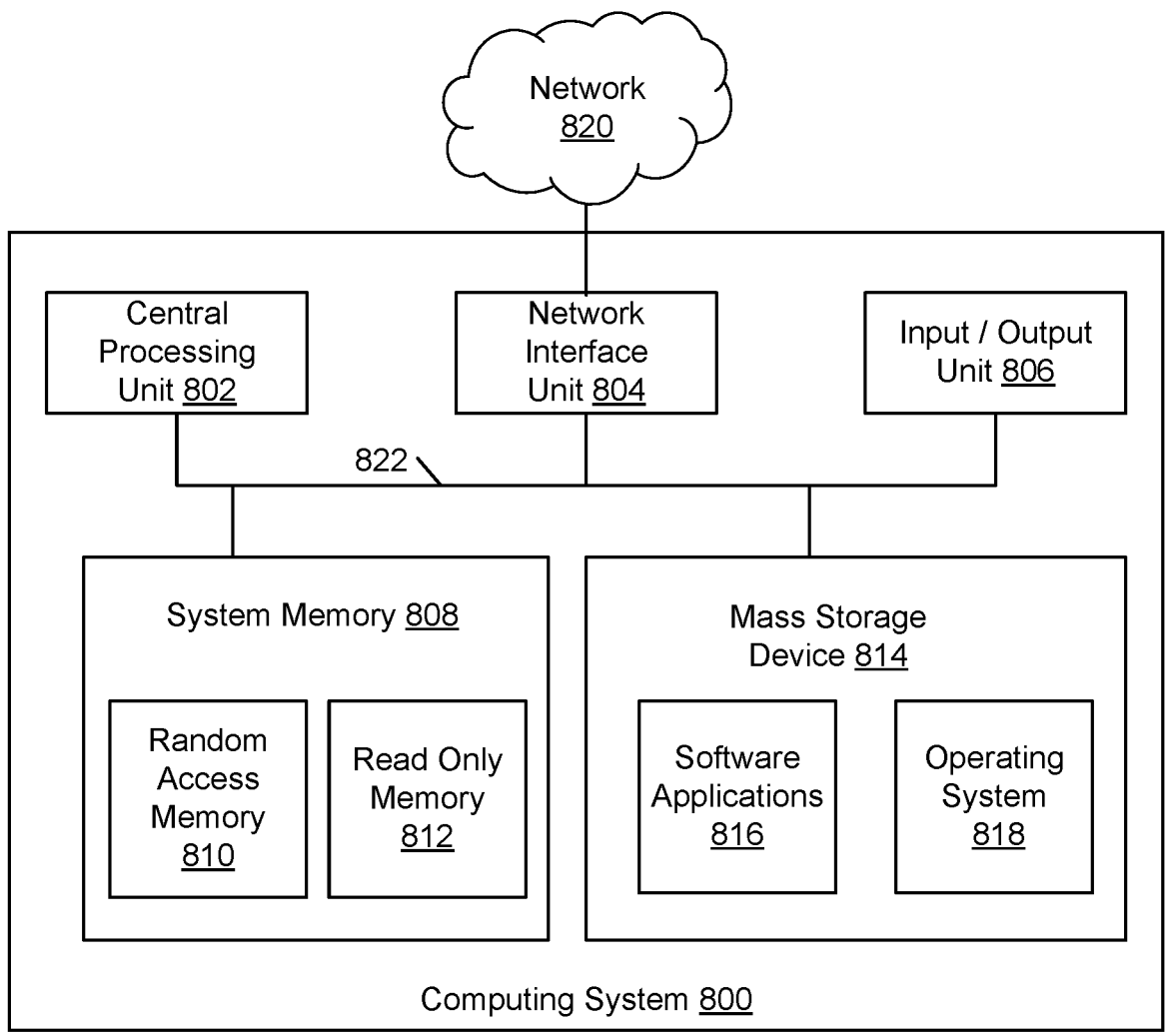
FIG. 8 illustrates an example computing device usable to implement aspects of the present disclosure.

FIG. 8 illustrates an example block diagram of a virtual or physical computing system 800. One or more aspects of the computing system 800 can be used to implement the image processing system 106, colored artifact detection system 110, or other computing systems described above in conjunction with FIG. 1.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the disclosure, the computing system 800 may operate in a networked environment using logical connections to remote network devices through the network 820. The network 820 is a computer network, such as an enterprise intranet and/or the Internet. The network 820 can include a LAN, a Wide Area Network (WAN), the Internet, wireless transmission mediums, wired transmission mediums, other networks, and combinations thereof. The computing system 800 may connect to the network 820 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

In accordance with the present disclosure, and as reflected in the embodiments below, the present image processing system including a colored artifact detection system has a number of technical advantages over existing systems. In particular, referring to FIGS. 1-8 overall, the colored artifact detection system provides an advantageous process for efficient detection of images with potentially high amounts of colored artifact in order to efficiently send only certain images for manual inspection of the image quality, correct problematic colored artifacts detected on images, and re-insert the images into a workflow to be sent to customers as final image products. By displaying images that have been flagged as having high amounts of colored artifact on an interactive and improved user interface, and subsequently highlighting the detected colored artifacts on the image, areas on the image having a high density of colored artifacts can be easily seen and additional image processing can remove the colored artifacts. Moreover, a feedback loop can be implemented such that once additional image processing is performed to remove the colored artifacts, the image may be sent back through the colored artifact detection process performed by the colored artifact detection system. Thus, the image may continue through the feedback loop until the image is no longer flagged as having high amounts of colored artifact, indicating that the image quality is acceptable to send the image to a customer as a final image product. The colored artifact detection system described herein improves the quality of final image products sent to customers, therefore improving customer satisfaction and the business relationship between a photography company or retailer and customers. The colored artifact detection system may be integrated within a larger workflow operation of a photography company or retailer and configured to interact with other systems and tools involved with photography stations, image capture and image processing, and fulfillment of image product orders from customers.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for detecting colored artifacts on an image of a subject, the method comprising:
   receiving an image, wherein the image has undergone background replacement processing;
   determining a density of colored artifacts on the image;
   in response to a determination that the image has a density of colored artifacts that exceeds a predetermined threshold, displaying the image on a user interface, wherein the user interface includes a selectable element that, in response to being selected, causes the colored artifacts to be highlighted on the image displayed on the user interface;
   receiving a selection through the user interface of the selectable element; and
   in response to receiving the selection of the selectable element, highlighting the colored artifacts on the image displayed on the user interface.

2. The method of claim 1, wherein determining the density of colored artifacts comprises:
   receiving an original image, the original image being the image before undergoing background replacement processing;
   generating an image mask by comparing the original image and the image to identify pixels that changed during the background replacement processing;
   based on the image mask, generating a difference image by identifying, within the identified changed pixels, pixels in a predetermined color range representative of colored artifacts on the image;
   identifying clusters of changed pixels in the difference image; and
   based on the identified clusters, determining the density of colored artifacts on the image.

3. The method of claim 1, wherein the predetermined threshold is a ratio of colored artifacts relative to a surface area the image.

4. The method of claim 1, further comprising:
   in response to highlighting the colored artifacts on the image, receiving input through the user interface to remove the colored artifacts on the image.

5. The method of claim 1, further comprising:
   in response to highlighting the colored artifacts, receiving input through the user interface to send the image to a specialist with instructions to remove the colored artifacts on the image.

6. The method of claim 1, further comprising:
   categorizing the density of colored artifacts on the image as very high, high, medium, or low, wherein the density of colored artifacts exceeds the predetermined threshold based on a categorization of very high or high.

7. The method of claim 6, wherein the user interface further includes an indicator of the categorization of the density of colored artifacts on the image.

8. The method of claim 1, further comprising,
   identifying locations of the colored artifacts on the image with (x,y) coordinates.

9. The method of claim 1, further comprising:
   receiving input through the user interface indicating that a quality of the image is acceptable to send the image to a customer based on a manual inspection for colored artifacts on the image.

10. The method of claim 1, wherein the highlighting of the colored artifacts is presented on the user interface in a color different from the colored artifacts.

11. The method of claim 1, determining a density of colored artifacts on the image is performed on a defined portion of the image, the defined portion being less than the entire image.

12. The method of claim 1, wherein the colored artifacts are blue artifacts.

13. A system for detecting colored artifacts on an image of a subject, the system comprising:
   a user interface; and
   a computing system including a processor, and a memory communicatively coupled to the processor, the memory storing instructions executable by the processor to:
   receive an image, wherein the image has undergone background replacement processing;
   determine a density of colored artifacts on the image;
   in response to a determination that the image has a density of colored artifacts that exceeds a predetermined threshold, display the image on a user interface, wherein the user interface includes a selectable element that, in response to being selected, causes the colored artifacts to be highlighted on the image displayed on the user interface;
   receive a selection through the user interface of the selectable element; and
   in response to receiving the selection of the selectable element, highlight the colored artifacts on the image displayed on the user interface.

14. The system of claim 13, wherein to determine a density of colored artifacts on the image, the instructions stored in the memory are further executable by the process to:
   receive an original image, the original image being the image before undergoing background replacement processing;

generate an image mask by comparing the original image and the image to identify pixels that changed during the background replacement processing;

based on the image mask, generate a difference image by identifying, within the identified changed pixels, pixels in a predetermined color range representative of colored artifacts on the image;

identify clusters of changed pixels in the difference image; and based on the identified clusters, determine the density of colored artifacts on the image.

15. The system of claim 13, wherein the instructions stored in the memory are further executable by the process to:

in response to highlighting the colored artifacts on the image, receive input through the user interface to remove the colored artifacts on the image.

16. The system of claim 13, wherein the instructions stored in the memory are further executable by the process to:

categorize the density of colored artifacts on the image as very high, high, medium, or low, wherein the density of colored artifacts exceeds the predetermined threshold based on a categorization of very high or high.

17. The system of claim 16, wherein the user interface further includes an indicator of the categorization of the density of colored artifacts on the image.

18. The system of claim 13, wherein the instructions stored in the memory are further executable by the process to:

identify locations of the colored artifacts on the image with (x,y) coordinates.

19. The system of claim 13, wherein the instructions stored in the memory are further executable by the process to:

receive input through the user interface indicating that a quality of the image is acceptable to send the image to a customer based on a manual inspection for colored artifacts on the image.

20. A computer-readable storage device storing data instructions that, when executed by a processing device of a computing device, cause the computing device to generate a user interface comprising:

an image of a subject, wherein the image has undergone background replacement processing and includes a density of colored artifacts that exceeds a predetermined threshold;

an indicator reflecting a level of colored artifacts detected on the image;

a first selectable element that, in response to being selected, causes the colored artifacts on the image to be highlighted, wherein the highlighting of the colored artifacts is presented in a color different from the colored artifacts; and a second selectable element that, in response to being selected, causes a notification to be sent to a photography retailer computing device indicating that a quality of the image is acceptable to send the image to a customer computing device based on a manual inspection for colored artifacts on the image.

* * * * *